(12) United States Patent
Parsley (10) Patent No.: US 9,738,363 B1
(45) Date of Patent: Aug. 22, 2017

(54) CONTINUOUS TRACK OUTBOARD MOTOR FOR WATERCRAFT PROPULSION

(71) Applicant: The United States of America as represented by the Secretary of the Navy, Washington, DC (US)

(72) Inventor: Adam Parsley, Bedford, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/080,968

(22) Filed: Mar. 25, 2016

(51) Int. Cl.
| | | |
|---|---|---|
| *B63H 1/34* | (2006.01) | |
| *B63H 1/04* | (2006.01) | |
| *B63H 20/06* | (2006.01) | |
| *B63H 20/32* | (2006.01) | |
| *B60F 3/00* | (2006.01) | |

(52) U.S. Cl.
CPC ............ *B63H 1/34* (2013.01); *B60F 3/0015* (2013.01); *B63H 20/06* (2013.01); *B63H 20/32* (2013.01); *B63B 2745/04* (2013.01); *B63H 2001/348* (2013.01)

(58) Field of Classification Search
CPC ........ B60F 3/00; B60F 3/0015; B60F 3/0007; B60F 3/003; B63H 1/34; B63H 20/06; B63H 20/34; B63H 2001/348; B63B 2745/04
USPC ................. 440/12.56, 12.63, 91, 95, 96, 97
See application file for complete search history.

(56) References Cited

U.S. PATENT DOCUMENTS

| | | | |
|---|---|---|---|
| 1,483,762 A * | 2/1924 | Alcorn | B63H 1/34 440/96 |
| 1,749,276 A | 3/1930 | Edmonds | |
| 2,138,207 A | 11/1938 | Roebling | |
| 2,916,006 A | 12/1959 | Crandall | |
| 2,980,054 A | 4/1961 | Sanders | |
| 3,063,401 A | 11/1962 | Patee | |
| 3,251,334 A * | 5/1966 | Beardsley | B63H 1/02 440/90 |
| 3,376,843 A | 4/1968 | Wilson | |
| 3,487,802 A | 1/1970 | Roy | |
| 3,646,904 A | 3/1972 | Lanning et al. | |
| 3,853,085 A | 12/1974 | Halboth | |
| 3,976,025 A | 8/1976 | Russell | |
| 4,736,702 A | 4/1988 | Gubin | |
| 5,184,564 A | 2/1993 | Robbins et al. | |
| 5,984,032 A | 11/1999 | Gremillion et al. | |
| 6,062,156 A | 5/2000 | Radke et al. | |
| 6,149,474 A | 11/2000 | Olkowski, Jr. | |
| 6,390,864 B1 | 5/2002 | Jenkins | |

(Continued)

FOREIGN PATENT DOCUMENTS

| | | | | |
|---|---|---|---|---|
| FR | 1351529 A * | 2/1964 | | B63B 1/22 |
| WO | WO 8803498 A1 * | 5/1988 | | B60F 3/0015 |
| WO | WO 8910298 A1 * | 11/1989 | | A63H 1/34 |

OTHER PUBLICATIONS

Arctic Insider, TGIF: The Jun. 20, 2014 Edition, retrieved on Oct. 27, 2015 from www.articinsider.com/Article/TGIF-The-June-20-2014-Edition; 3 pages.

*Primary Examiner* — Anthony Wiest
(74) *Attorney, Agent, or Firm* — Christopher A. Monsey (57) ABSTRACT

A watercraft propulsion system configured to be coupled to the transom of a boat. A continuous track is supported by a suspension frame and operably coupled to an outboard motor.

27 Claims, 6 Drawing Sheets

(56) References Cited

U.S. PATENT DOCUMENTS

| | | |
|---|---|---|
| 6,505,694 B2 | 1/2003 | Maguire |
| 6,595,812 B1 | 7/2003 | Haney |
| 6,918,801 B2 | 7/2005 | Wilson, Jr. et al. |
| 6,921,304 B2 | 7/2005 | Hewitt |
| 7,063,580 B1 | 6/2006 | Birdwell |
| 8,002,596 B2 | 8/2011 | Wernicke et al. |
| 8,317,555 B2 | 11/2012 | Jacobsen et al. |
| 8,678,868 B2 | 3/2014 | Bailey et al. |
| 8,721,378 B2 | 5/2014 | Da Silva |
| 8,777,680 B2 | 7/2014 | MacDonald |
| 9,242,523 B2 * | 1/2016 | Teppig, Jr. ............ B60F 3/0015 |
| 2005/0079776 A1 * | 4/2005 | Miller ..................... B63H 1/34 |
| | | 440/95 |
| 2006/0178059 A1 | 8/2006 | Metheny et al. |
| 2009/0124143 A1 | 5/2009 | Kanerva |
| 2015/0111446 A1 | 4/2015 | Nordberg et al. |

\* cited by examiner

CONTINUOUS TRACK OUTBOARD MOTOR FOR WATERCRAFT PROPULSION

STATEMENT REGARDING FEDERALLY SPONSORED RESEARCH OR DEVELOPMENT

The invention described herein was made in the performance of official duties by one or more employees of the Department of the Navy and may be manufactured, used and licensed by or for the United States Government for any governmental purpose without payment of any royalties thereon. This invention (Navy Case 103,210) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE DISCLOSURE

Early watercraft propulsion was often provided by paddle wheel systems including a rotating wheel partially submerged in water to provide forward propulsion. Such paddle wheel systems were largely replaced by underwater propellers, which were found to be more efficient when adequate water depth permitted their use.

Continuous track propulsion systems for amphibious vehicles and snowmobiles are known. These continuous track propulsion systems operate on the same general principal as a paddle wheel when utilized for waterborne propulsion, but offering the advantage of keeping a larger portion of the drive train perpendicular to water and therefore offering better efficiency than conventional paddle wheel designs. It is also known that a modern snowmobile can operate across the surface of water when dynamic lift from its track drive system keeps the nose of the snowmobile lifted and the skis 'skim' the surface of the water. However, when a conventional snowmobile slows down or stops on the surface of water, it will sink because of the lack of positive buoyancy and the lessening of the dynamic lift provided by the track drive system.

The present invention is configured to take advantage of a continuous track propulsion system, while incorporating it into an outboard motor, and coupling it with existing boats that can accept a standard transom-mounted motor and provide flotation with the advantages of a standard designed boat.

More particularly, the continuous track outboard motor (CTOM) for watercraft propulsion of the present disclosure is configured to be a modular, transom-mounted boat motor that better enables boat operation in shallow and/or obstructed water, where mud, sand, rocks, vegetation, logs, snags, frozen and semi-frozen surfaces, and other obstacles may be impediments to a standard propeller-driven outboard motor. Even specialty surface-drive "mud motors" typically cannot traverse ice or beach scenarios, where the illustrative continuous track outboard motor of the present disclosure can operate. The watercraft propulsion system of the present disclosure is intended to better enable shallow water operations for military, search and rescue, and recreational (e.g., hunting and fishing) small boat operators, by providing a reliable and simple drive mechanism that offers multiple advantages over alternatives such as air boats, air cushion vehicles (hovercraft), mud motors, or other amphibious vehicle propulsion systems.

According to an illustrative embodiment of the present disclosure, a watercraft propulsion system includes an outboard motor, a suspension frame supported below the motor, a drive wheel supported by the suspension frame and operably coupled to the motor, a first driven wheel supported by the suspension frame in spaced relation to the drive wheel, and a second driven wheel supported by the suspension frame in spaced relation to the drive wheel and the first driven wheel. A continuous track is supported by the drive wheel, the first driven wheel and the second driven wheel, the continuous track including an upper run engaging the first driven wheel, the second driven wheel and the drive wheel, and a lower run engaging the first driven wheel and the second driven wheel, the lower run extending below the upper run and including a downwardly facing water engagement surface. A transom mount is configured to couple the motor to the transom of a boat, the transom mount including a trim control for vertical adjustment of the suspension frame relative to the transom, and a tilt control for pivoting adjustment of the suspension frame relative to the transom.

According to another illustrative embodiment of the present disclosure, a watercraft propulsion system includes an outboard motor, a suspension frame supported by the motor, a drive wheel operably coupled to the motor, a first driven wheel supported by a suspension frame in spaced relation to the drive wheel, and a second driven wheel supported by the suspension frame in spaced relation to the drive wheel and the first driven wheel, a track path defined between the drive wheel, the first driven wheel and the second driven wheel. A continuous track is supported by the drive wheel, the first driven wheel and the second driven wheel, the continuous track including a downwardly facing water engagement surface. The suspension frame includes a base member and an upright member coupled to the base member. A base actuator is coupled to the base member for adjusting the length of the base member, and an upright actuator is coupled to the upright member for adjusting the length of the upright member. The distance between the first driven wheel and the second driven wheel may be adjusted to vary the water engagement surface. A controller is operably coupled to the base actuator and the upright actuator for maintaining a constant length of the track path as the length of the base member and the length of the upright member of the suspension frame are adjusted.

According a further illustrative embodiment of the present disclosure, a method of propelling a watercraft includes the steps of providing a boat including a transom, providing an adjustable suspension frame coupled to the transom of the boat, and rotating a continuous track on the suspension frame, wherein the continuous track includes an upper run engaging a first driven wheel, a second driven wheel, and a drive wheel, and a lower run engaging the first driven wheel and the second driven wheel, the lower run extending below the upper run and including a downwardly facing water engagement surface. The method further includes the steps of detecting the speed of the continuous track, and varying the downwardly facing water engagement surface of the continuous track contacting the water based upon the detected speed.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
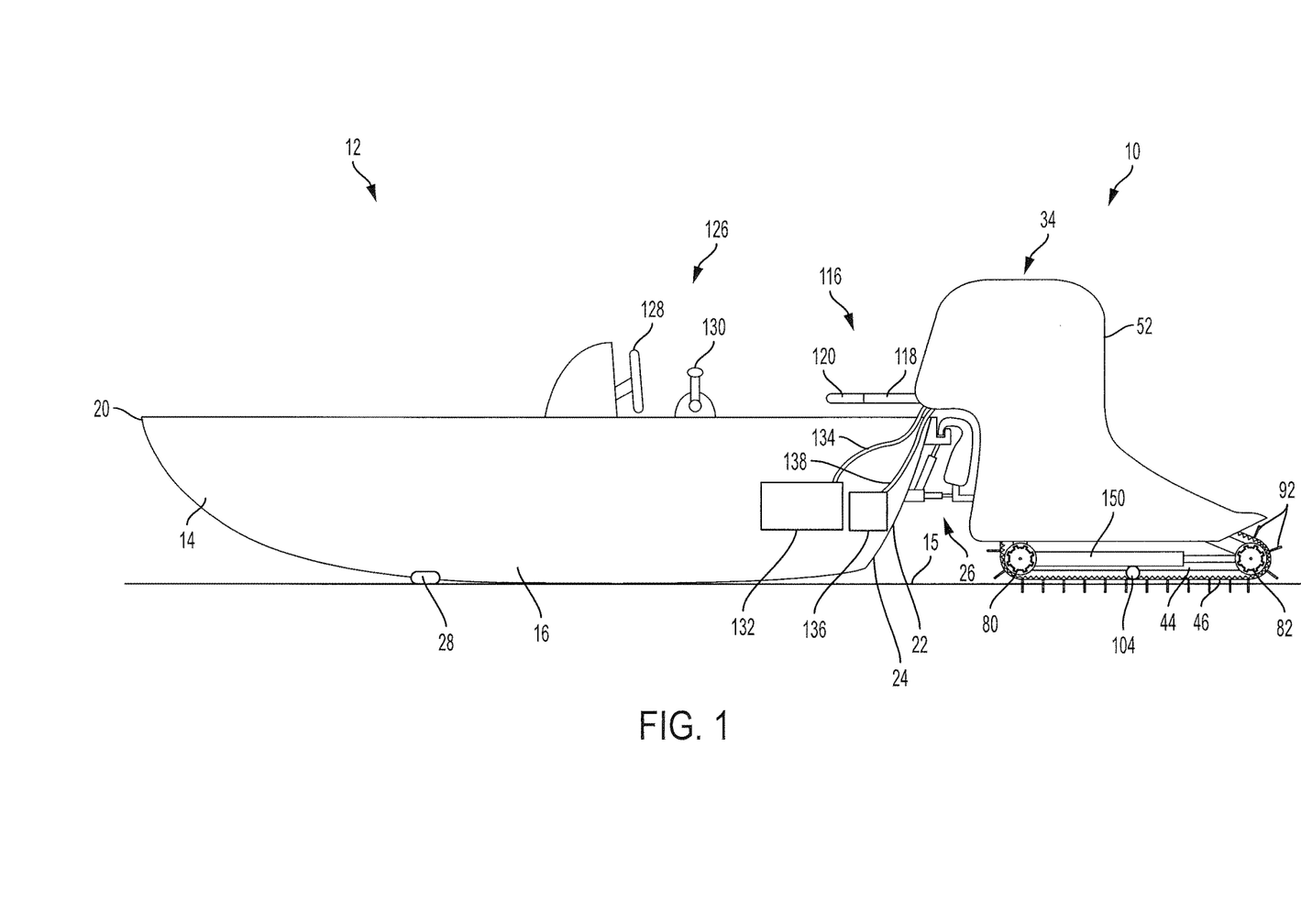
FIG. 1 is a side elevational view of an illustrative watercraft propulsion system coupled to the transom of a boat supported by water.
Figure 2:
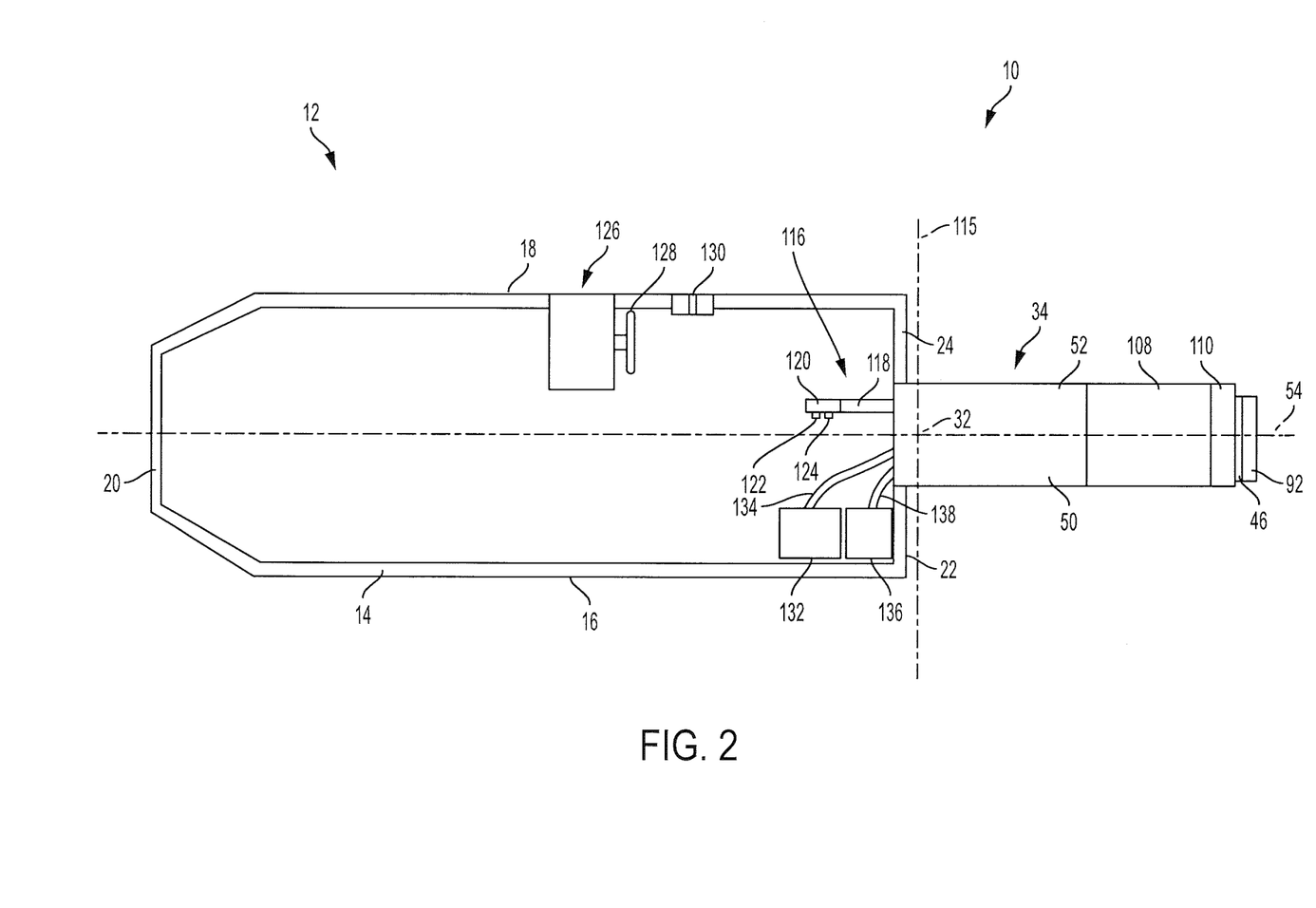
FIG. 2 is a top plan view of the illustrative watercraft propulsion system of FIG. 1.
Figure 3:
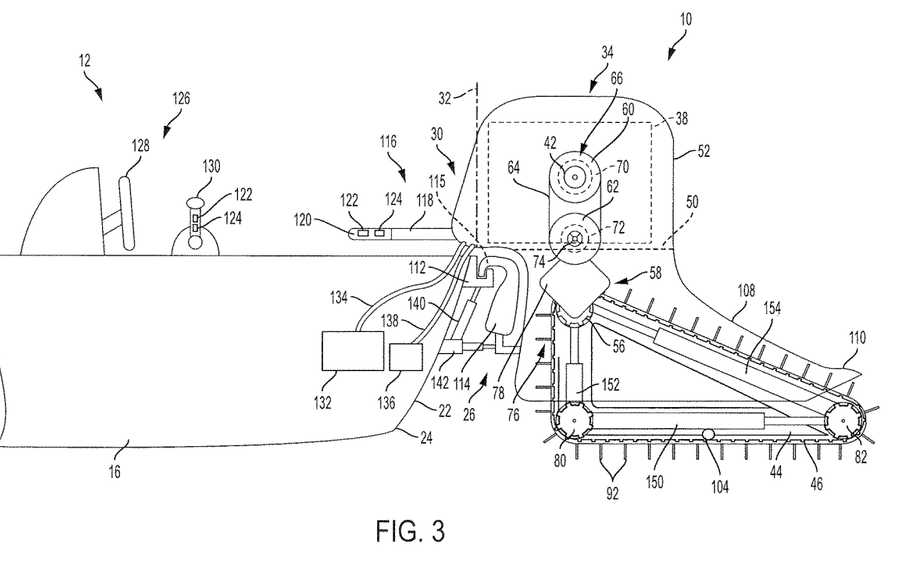
FIG. 3 is a detailed view of the watercraft propulsion system of FIG. 1, with a partial cut-away, showing additional details of the adjustable suspension supporting the continuous track.

With reference initially to FIGS. 1-3, an illustrative watercraft propulsion system 10 is shown coupled to a boat 12. The boat 12 may be of conventional design as including a buoyant hull 14 configured to be supported on the surface of water 15, and having a port side 16 and a starboard side 18 extending between a front end or bow 20 and a rear end or stern 22. A vertical wall or transom 24 is supported by the stern 22 and extends between the opposing port and starboard sides 16 and 18. The watercraft propulsion system 10 of the present disclosure is illustratively coupled to the transom 24 of the boat 12 by a transom coupler or mount 26.

With reference to FIG. 1, a water or boat speed sensor 28 is illustratively coupled to the hull 14 of the boat 12 and is configured to detect the speed of the boat 12 travelling through the water 15. The boat speed sensor 28 may be of conventional design as including a paddle wheel that is driven in rotation by water impacting paddles. Other types of boat speed sensors may be substituted therefor, such as global positioning sensors (GPS).

Figure 4:
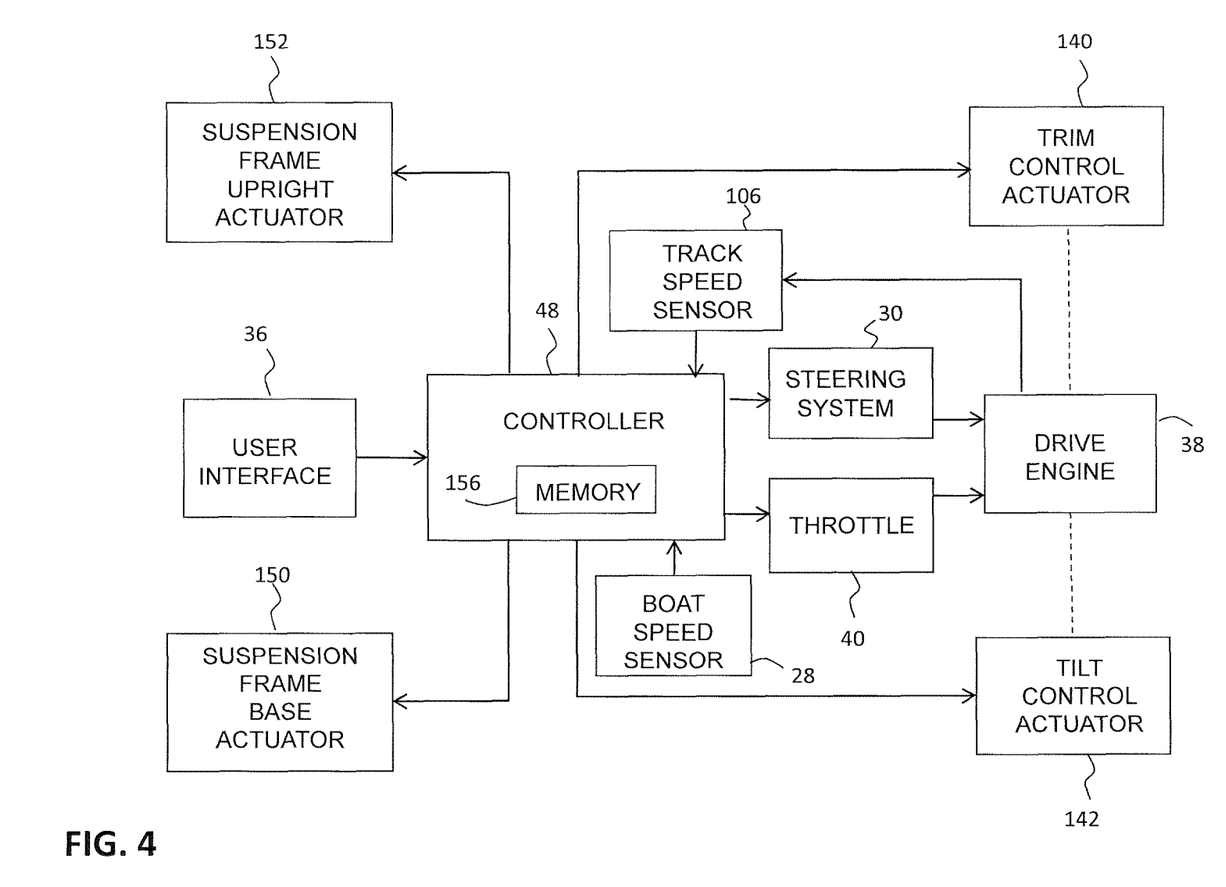
FIG. 4 is a block diagram illustrating interconnections between various components of the watercraft compulsion system.

With reference to FIGS. 3 and 4, a steering system 30 is operably coupled to the watercraft propulsion system 10 for pivoting the propulsion system 10 about an upwardly extending steering pivot axis 32. More particularly, the steering system 30 may pivot the watercraft propulsion system 10 to the left and right about an upwardly extending pivot axis 32 for steering the boat 12.

The illustrative watercraft propulsion system 10 includes a continuous track outboard motor 34 operably coupled to a user interface 36. As further detailed herein, the motor 34 may include a throttle 40 for controlling operating speed of the watercraft propulsion system 10. The motor 34 illustratively comprises a conventional outboard engine 38 of the type used to drive a propeller (not shown). The engine 38 illustratively includes rotatable drive or crank shaft 42 extending parallel to the stern 22. A suspension frame 44 is illustratively supported below the motor 34 and supports an endless or continuous belt or track 46 driven in movement by the drive shaft 42 of the engine 38. A controller 48 may be operably coupled to the user interface 36 and the motor 34 (FIG. 4).

The illustrative motor 34 may comprise a two or four stroke internal combustion engine 38 mounted to a frame 50 and received within an engine cowling 52. The continuous track outboard motor 34 is illustratively configured such that no water needs to be supplied to an impeller, such as is typically required by a conventional outboard motor. The continuous track outboard motor 34 is illustratively includes an air cooling system or a closed loop cooling system, either of which is configured to allow the operation in little or no water-such as is the normal method for employing mud motors (air cooled) or snowmobiles (air cooled and closed loop cooled). A closed loop cooling system would illustratively require a heat transfer design that would use contact with the water as a heat sink, but would not require the drawing up of the lake water via an impeller water pump such as in a conventional outboard motor.

While the motor 34 is illustratively an internal combustion engine 38, it should be appreciated that other drive actuators may be substituted therefor. For example, an electric motor or a hydraulic motor may be used as motor 34.

The motor 34 is illustratively configured to drive in rotation the horizontal engine drive shaft 42 mounted parallel to the stern 22 of the boat 12, and perpendicular to the direction of intended travel of the boat 12 along longitudinal axis 54 (FIG. 2). The drive shaft 42 illustratively transfers its torque to a drive wheel 56 via a transmission 58. In certain illustrative embodiments, the transmission 58 may be eliminated such that the drive shaft 42 of the motor 34 is directly coupled to the drive wheel 56.

Illustratively, the transmission 58 operably couples a driven pulley or wheel 60 to the drive pulley or wheel 62 via a belt and/or chain 64. The transmission 58 may further include a clutch system 66 (e.g., a single or double clutch system) to optimize the torque curve of the engine 38. The illustrative clutch system 66 includes a primary clutch 70 associated with the drive pulley 60, and a secondary clutch 72 associated with the driven pulley 62.

A driven jackshaft 74 is illustratively mounted on the suspension frame 44 and extends parallel to the engine drive shaft 42. The drive wheel 56 is rotatably supported by the suspension frame 44 and is operably coupled to the motor 34 through the jackshaft 74. A coupler 76 operably couples the driven pulley 62 to the jackshaft 74. The coupler 76 may comprise a conventional gear assembly or chain (not shown) received within a case or housing 78. More particularly, the jackshaft 74 is configured to drive in rotation the drive wheel 56 that, in turn, drives the continuous track 46. First and second driven wheels 80 and 82 are also rotatably supported by the frame 44 and support the continuous track 46. The first and second driven wheels 80 and 82 are supported by the suspension frame 44 in space relation to each other and to the drive wheel 56.

Figure 5A:
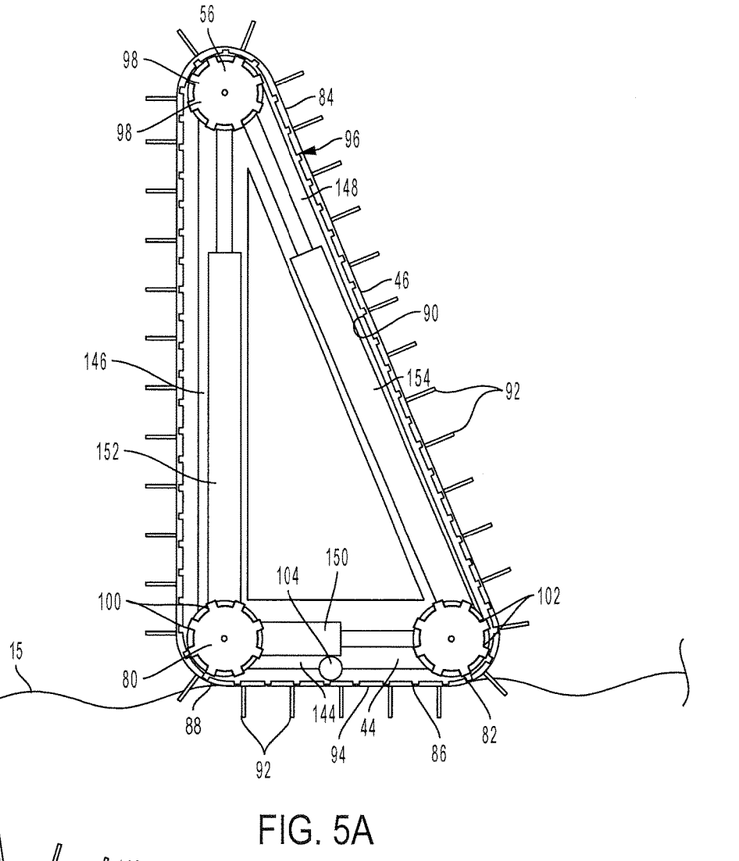
FIG. 5A is a partial diagrammatic view of the continuous track supported by the adjustable suspension, showing the suspension in a first or low speed configuration.
Figure 5B:
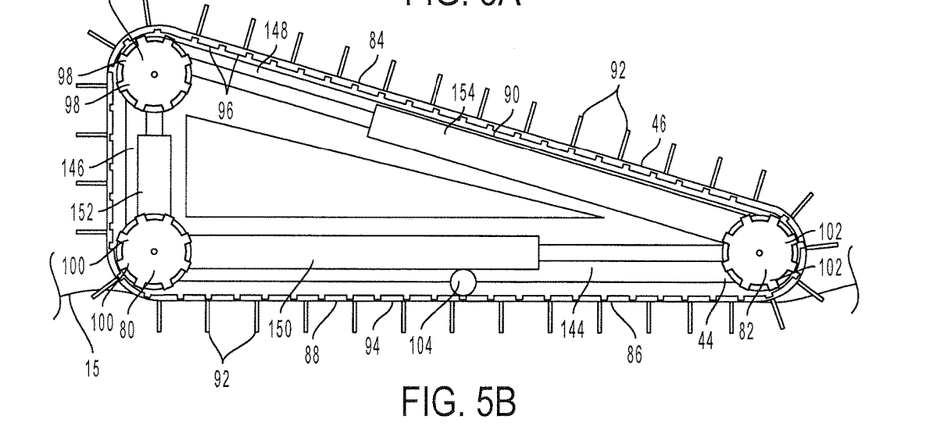
FIG. 5B is a partial diagrammatic view similar to FIG. 5A, showing the suspension in a second or high speed configuration.
Figure 5C:
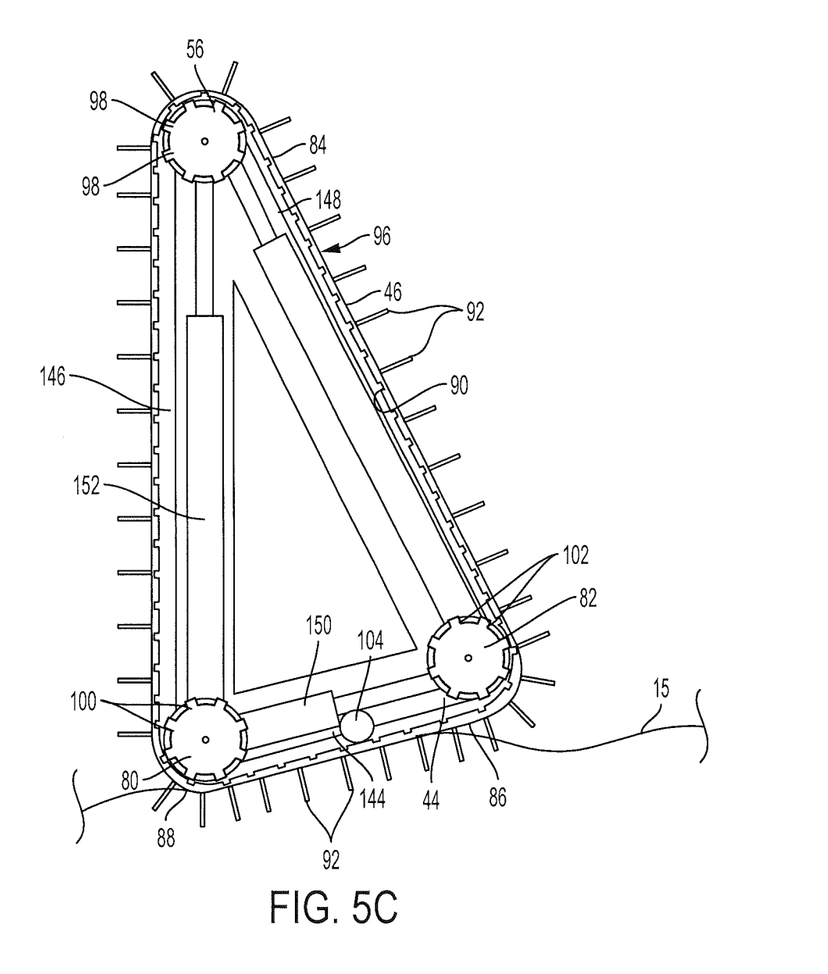
FIG. 5C is a partial diagrammatic view similar to FIG. 5A, showing the suspension in a third or tilted configuration.

With reference to FIGS. 5A-5C, the continuous track 46 extends along a track path around the wheels 56, 80 and 82 of a predetermined length (illustratively approximately 8 feet). While the path of the track 46 is illustratively of a triangular shape based upon the number and location of the wheels 56, 80 and 82, it should be appreciate that the path of the track 46 may vary based upon different numbers and/or positions of track engaging wheels 56, 80 and 82. The track 46 illustratively includes an upper run 84 engaging the first driven wheel 80, and a lower run 86 extending below the upper run 84. In an illustrative embodiment, the upper run 84 engages the first driven wheel 80, the second driven wheel 82 and the drive wheel 56, and the lower run 86 engages the first driven wheel 80 and the second driven wheel 82. The continuous track 46 is illustratively formed of a flexible material, such as an elastomeric belt or metal chain, and includes an outwardly facing surface 88 and an inwardly facing surface 90. The continuous track 46 may be a conventional rubber snowmobile track, selected from many available styles to provide optimum propulsion in when partially submerged in water.

The outwardly facing surface 88 of the continuous track 46 illustratively includes a plurality of longitudinally spaced apart protrusions or paddles 92. The outwardly facing surface 88 of the lower run 86 defines a downwardly facing water engagement surface 94 extending between the first and second driven wheels 80 and 82. The paddles 92 of the continuous track 46 provide for improved water displacement and propulsion of the propulsion system 10.

The inwardly facing surface 90 of the continuous track 46 includes a plurality of teeth or cogs 96, and the wheels 56, 80, 82 each include a plurality of teeth or cogs 98, 100, 102 configured to engage with the cogs 96 of the track 46. The continuous track 46 is configured to move around the frame 44 that is optimally shaped to contact the surface of the water immediately behind the boat 12. The continuous track 46 rides on wheels 56, 80, 82 positioned around the frame 44 so as to minimize friction and minimize amount of water lifted and carried back to toward the engine 38. At least one idler wheel 104 may be rotatably supported by the frame 44 to assist in guiding the continuous track 46 and to maintain tension in the track 46. The idler wheel 104 may be operably coupled to a track speed sensor 106 in electrical communication with the controller 48.

The paddles 92 of the continuous track 46 illustratively have a length (i.e., distance from the outwardly facing surface 88 to a tip or outer end of the paddle 92) to provide optimal 'grip' of the water without causing undesired disturbance (either venting or cavitating) of the water, and of a spacing, or pitch, so that one paddle 92 does not overly interfere with the supply of water to the successive paddle 92 that follows behind it. The lateral width of the track 46 may vary based upon performance requirements. For example, the track 46 may be narrowed to lighten the track 46 and for use with a smaller engine 38. Metal studs (not shown) may also be supported by the outwardly facing surface 88 of the track 46 to allow for improved operation, for example, over frozen or semi-frozen surfaces.

With reference to FIGS. 2 and 3, a housing encasement 108 is illustratively coupled to the engine cowling 52 and receives the upper run 84 of the continuous track 46. The housing encasement 108 includes a rear shield or deflector 110 extending above the upper run 84 of the track 46 proximate the rear wheel 82. The rear deflector 110 is configured to eliminate excessive water lifting and spray, and protect the engine 38 and the transmission 58 from over exposure to water and spray. All materials of the watercraft propulsion system 10 are selected to ensure endurance in a wet environment (plastic or fiberglass cowling, aluminum frame, alloy or composite or plastic wheels and shafts and engine components).

With reference to FIGS. 2 and 3, the transom mount 26 may illustratively include a clamp 112 configured to mechanically couple or secure the continuous track outboard boat motor 34 to the transom 24 of the boat 12. A connector 114 defines a universal joint with the clamp 112. More particularly, the connector defines the steering pivot axis 32 and a tilt pivot axis 115 extending substantially perpendicular to the steering pivot axis 32 and parallel to the stern 22.

With reference to FIGS. 2 and 3, the steering system 30 and the throttle 40 may be operably coupled to the user interface 36. In one illustrative embodiment, the user interface 36 is defined by a tiller steering and throttle control system 116 illustratively coupled to the motor 34 to control rotation of the track 46 about the steering pivot axis 32, and the speed of the motor 34 and subsequent movement of the track 46 as a result of rotation of the drive wheel 56. The tiller steering and throttle control system 116 illustrative includes a handle 118 supporting a rotatable grip 120. In this tiller control arrangement, an operator of the boat 12 illustratively sits near the stern 22 of the boat 12 and provides throttle control via the grip 120 of the handle 118, and steers the boat 12 by moving the tiller handle 118 left or right as is the standard method with a conventional outboard motor 38. The tiller handle 118 may also include the trim and tilt controls 122 and 124 for optimizing the trim and tilt angle of the motor 34 and continuous track 46 with respect to the surface of the water 15.

In another illustrative embodiment, the steering system 30 and the throttle 40 may be operably coupled to the user interface 36, for example, through the controller 48 (FIG. 4). Illustratively, the user interface 36 may be defined by a console 126 including a steering wheel 128 operably coupled to the motor 34 to rotate the motor 34 about the steering pivot axis 32. The illustrative user interface 36 may further include a hand (or foot) controlled throttle lever 130 (or pedal) operably coupled to the throttle 40. The console steering wheel 128 and hand controlled throttle lever 130 may be substituted for, or used in addition with, the tiller steering and throttle control system 116.

The steering console 126, illustratively positioned either on the starboard side 18 or in the center of the boat 12, supports the steering wheel 128 which may be operably coupled to the steering system 30 (such as a rack-and-pinion or hydraulic steering system) which, in turn, is connected to the outboard motor 34. The throttle lever 130 may be present at the right hand or as a foot control (commonly called "hotfoot") of the operator and the trim and tilt controls 122 and 124 are provided either on the throttle lever 130, steering wheel 128, or console 126 that the operator uses. The boat 12 could also be arranged with dual motors in a console steering scenario, such as is the manner with conventional outboards to provide more power to larger boats.

The motor 34 may be fluidly coupled to a fuel supply 132 (e.g., a gasoline tank) via a fluid supply tube 134, and in electrical communication with an electrical supply 136 (e.g., a battery) via an electrical cable 138. Both the fuel supply 132 and the electrical supply 136 are illustratively mounted inside the hull 14 of the boat 12 near the stern 22.

With reference to FIGS. 3 and 4, a trim control actuator 140 and a tilt control actuator 142 are operably coupled to the transom mount 26, and are in communication with the trim and tilt controls 122 and 124, respectively, via the controller 48. Each of the trim control and tilt control actuators 140 and 142 may be of conventional design, such as a hydraulic or electric jack. Actuation of the trim control actuator 140 raises and lowers the frame 44 and drive track 46 in a generally vertical direction, illustratively to maintain the water engagement surface 94 in contact with the surface of the water 15. Actuation of the tilt control actuator 142 pivots the frame 44 and the drive track 46 about axis 115. The tilt control actuator 142 pivots the frame 44 to change the angle of the water engagement surface 94 in response to changing inclination or attitude of the boat hull 14 relative to the surface of the water 15 as the speed of the boat increases (which may be measured by the boat speed sensor 28).

Illustratively, the trim and tilt controls 122 and 124 are operably coupled to the motor 34 for raising and lowering the motor 34 relative to the stern 22. As noted above, these features are configured to optimize the contact of the propulsion system 10 with the water 15 relative to load and speed.

In either illustrative embodiment, using the tiller steering and throttle control system 116 or the steering console 126, the continuous drive outboard motor 34 is configured to operate in a nearly identical manner to a standard outboard boat motor. An operator that is familiar with tiller or console operated conventional outboard motor would be able to easily operate the continuous track outboard motor 34 with no significant additional learning required.

With reference now to FIGS. 5A and 5B, the suspension frame 44 may be an articulating frame configured to modify the path of the continuous track 46. In one illustrative embodiment, the frame 44 includes a base member 144, an upright member 146 and a connecting member 148. The drive wheel 56 is rotatably coupled to the upper end of the upright member 146 at the intersection with the connecting member 148. The first driven wheel 80 is rotatably coupled the lower end of the upright member 146 at the intersection with the forward end of the base member 144. The second driven wheel 82 is rotatably coupled to the rear or aft end of the base member 144 at the intersection with the connecting member 148. A suspension frame base actuator 150 is coupled to the base member 144 for adjusting the length of the base member 144, and thereby the distance between the first driven wheel 80 and the second driven wheel 82. A suspension frame upright actuator 152 is coupled to the upright member 146 for adjusting the length of the upright member 146, and thereby the distance between the drive wheel 56 and the first driven wheel 80. A connecting actuator 154 may be coupled to the connecting member 148 for adjusting the length of the connecting member 148, and thereby the distance between the drive wheel 56 and the second driven wheel 82.

The base actuator 150 and the upright actuator 152 are operably coupled to the controller 48. The controller 48 illustratively includes a memory 156 configured to store configuration data. For example, the configuration data may include information associating desired contact between the water engagement surface 94 of the drive track 46 in relation to a speed as detected by the boat speed sensor 28 and/or the track speed sensor 106. In response to the detected speed from the sensor(s) 28, 106, the controller 48 may operate the trim control actuator 140 to adjust trim (i.e., vertical height) of the water engagement surface 94, and/or may operate the tilt control actuator 142 to adjust tilt (i.e., angle of the water engagement surface 94). The controller 48 may also adjust the suspension frame 44 to control the length, and resulting available contact area, of the water engagement surface 94. FIG. 5A illustrates a low speed configuration of the suspension frame 44 and drive track 46, while FIG. 5B illustrates a high speed configuration of the suspension frame 44 and drive track 46.

In an illustrative operation, if speed detected from the boat speed sensor 28 and/or the track speed sensor 106 increases then the base actuator 150 extends, thereby increasing the length of the base member 144 (i.e., distance between the first and second driven wheels 80 and 82). Concurrently, the upright actuator 152 retracts, thereby decreasing the length of the upright member 146 (i.e., distance between the drive wheel 56 and the first driven wheel 80). The connecting actuator 154 may adjust accordingly to maintain a constant path length of the track 46 (and resulting tension within the track 46). As such, the downwardly facing water engagement surface 94 of the track 46 increases while maintaining a constant path length of the track 46.

Conversely, if speed detected from the boat speed sensor 28 and/or the track speed sensor 106 decreases, then the base actuator 150 retracts, thereby decreasing the length of the base member 144 (i.e., distance between the first and second driven wheels 80 and 82). Concurrently, the upright actuator 152 extends, thereby decreasing the length of the upright member 146 (i.e., distance between the drive wheel 56 and the first driven wheel 80). The connecting actuator 154 may adjust accordingly to maintain a constant path length of the track 46 (and resulting tension within the track 46). As such, the downwardly facing water engagement surface 94 of the track 46 decreases while maintaining a constant path length of the track 46.

FIG. 5C shows the suspension frame 44 in a further illustrative configuration providing for the tilting of the water engagement surface 94. For example, if the speed detected from the boat speed sensor 28 increases, then the base actuator 150 extends, thereby extending the length of the base member 144 (i.e., distance between the first and second driven wheels 80 and 82). Concurrently, the connecting actuator 154 retracts, thereby decreasing the length of the connecting member 148 and moving the second driven wheel 82 upwardly relative to the first driven wheel 80, while maintaining a constant path length of the track 46 (and resulting tension within the track 46). As such, the downwardly facing water engagement surface 94 of the track 46 is pivoted upwardly in order to facilitate engagement with the surface of the water 15 as the inclination or attitude of the boat 12 changes as a result of speed. It should be appreciated that if the speed detected from the boat speed sensor 28 decreases, then the base actuator 150 may retract, and the connecting actuator may extend, thereby causing the downwardly facing engagement surface 94 to pivot downwardly.

Advantages of the continuous track outboard boat motor 34 may be found in the shallow and obstructed water in which it can operate when compared to a traditional propeller driven outboard motor. No part of the motor, other than the paddles 92 of the continuous track 46 will be submerged below the surface of the water 15, which equates to less drag and shallower water operation. Also, since no water will be used to cool the engine 38, as is typically the case with conventional outboard motor, again shallow water operation will be enabled. Even more unique in a continuous track outboard motor 34 is that operation on ice or surf and even beach scenarios will be enabled. Such operation would compete with the capability of an airboat. Modern airboats use high power engines and air propellers to force a relatively flat bottomed boat over water, ice, swamp, grass, and even land. However the fuel consumption, noise levels, engine configuration, and special boat design and skills required to operate an airboat are sometimes prohibitive for use with most average boaters.

A boat using a continuous track motor 34 would be intuitively operated by almost any conventional boater, would require little extra skill sets over conventional boating skills, and could enable nearly all the terrain that an airboat could cover without being so purpose built. The only extra modification that a conventional boat might require for a continuous track outboard motor might be a coating or material on the hull—which would typically be aluminum— to lessen friction and increase durability. Polymers and coatings are well known for this employment. Military, law enforcement and rescue personnel using a continuous track outboard motor 34 could run their small craft right up onto the beach or riverine and delta terrains, and with dual or sufficiently powered single engines, might even be able to power a boat up onto a beach, turn around, and come back into water in a semi-amphibious operation that would require no disembarking from the craft.

The continuous track outboard motor 34 is illustratively impervious to fouling barriers that might be used to try to snag other types of conventional propeller driven craft. Search and rescue crews with a boat with a continuous track outboard motor 34 could use small boats for search and rescue on thin ice or ice that turns to open water. The continuous track outboard motor 34 would allow a craft to be powered across ice, then into thawed, open water areas, and back onto the ice for rescue operations, and in flooding scenarios, without the skills required to operate a helicopter, hovercraft, or airboat that might have to be used for a similar operation otherwise. A small boat equipped with a continuous track outboard motor 34 would be a multi-use craft with more durability, less specialized skills, and less initial purchase and operating cost than a hovercraft, helicopter, and airboat.

The continuous track outboard motor 34 provides a unique configuration of a continuous track 46 being used in a design arrangement of a transom mounted outboard motor configuration, to enable operation with common boats in shallow water and normally inaccessible terrains such as mud and ice. The focus of the continuous track outboard motor 34 is making a common boat much more flexible without a special, purpose-built craft that is typically high cost. The continuous track outboard motor 34 also uses commonly available components—hydraulic trim/tilt, jacks, clamps, engines, drive trains, tracks—commonly found in other related industries to configure a design that has a high percentage of off-the-shelf parts to drive a relatively low cost motor system.

The continuous track outboard motor 34 equipped small boat would be ideal for fisherman who must traverse shallow water, such as is found in multiple freshwater lakes and especially in the saltwater flats of the Gulf of Mexico. The continuous track outboard motor 34, with its rubberized track, would also likely prevent injury to marine mammals such as manatees and dolphins, which are known to commonly be cut and even killed by conventional propeller motors. Operators of shallow, rocky rivers, who typically rely on jet boats, would find a continuous track outboard motor 34 advantageous because of the disadvantages of jet motors requiring high horsepower and their tendency to ingest rocks and sand that wear on or severely damage their impellers.

The continuous track outboard motor 34, appropriately set up with a hydraulic lift for adjusting the height above the transom, could be lowered for more contact with terrains such as beach and ice, and with wheels on the front of a boat, could even enable hard surface operation (boat ramps, gravel roads, paved roads, ice, slush, hard packed snow). This could enable access to typically inaccessible waters or surfaces for all manner of individuals-hunters, fisherman, search and rescue, and military.

Although the invention has been described in detail with reference to certain preferred embodiments, variations and modifications exist within the spirit and scope of the invention as described and defined in the following claims.

The invention claimed is:

1. A watercraft propulsion system comprising: an outboard motor;
    a suspension frame supported below the motor, the suspension frame including a base member and an upright member coupled to the base member, a base actuator coupled to the base member for adjusting the length of the base member, and an upright actuator coupled to the upright member for adjusting the length of the upright member;
    a drive wheel supported by the suspension frame and operably coupled to the motor;
    a first driven wheel supported by the suspension frame in spaced relation to the drive wheel;
    a second driven wheel supported by the suspension frame in spaced relation to the drive wheel and the first driven wheel;
    a continuous track supported by the drive wheel, the first driven wheel and the second driven wheel, the continuous track including an upper run engaging the first driven wheel, the second driven wheel and the drive wheel, and a lower run engaging the first driven wheel and the second driven wheel, the lower run extending below the upper run and including a downwardly facing water engagement surface; and
    a transom mount for coupling the motor to the transom of a boat, the transom mount including a trim control for vertical adjustment of the suspension frame relative to the transom, and a tilt control for pivoting adjustment of the suspension frame relative to the transom,
    wherein the suspension frame is configured to be articulated such that the distance between the first driven wheel and the second driven wheel may be adjusted to vary a length of the water engagement surface.

2. The watercraft propulsion system of claim 1, further comprising a controller operably coupled to the base actuator and the upright actuator for maintaining a constant tension in the continuous track as the suspension frame is articulated.

3. The watercraft propulsion system of claim 2, further comprising a track speed sensor operably coupled to the controller, wherein the controller causes the base actuator to adjust the water engagement surface in response to input from the track speed sensor.

4. The watercraft propulsion system of claim 1, wherein the upright actuator is configured to provide the trim control by vertically raising the lower run of the continuous track.

5. The watercraft propulsion system of claim 1, wherein the suspension frame further includes a connecting member coupled to the upright member and the base member, a connecting actuator coupled to the connecting member for adjusting the length of the connecting member, such that the distance between the drive wheel and the second driven wheel may be adjusted thereby providing the tilt control by vertically raising the second driven wheel relative to the first driven wheel.

6. The watercraft propulsion system of claim 1, further comprising a deflector vane position above the second driven wheel for diverting in a rearward direction water thrown by the upper run of the track when moving in a forward direction.

7. The watercraft propulsion system of claim 6, further comprising a cowling supported over the motor and supporting the deflector vane.

8. The watercraft propulsion system of claim 1, wherein the drive wheel includes a plurality of circumferentially spaced cogs, and the continuous track includes an inner surface including a plurality of teeth configured to engage with the cogs of the drive wheel.

9. The watercraft propulsion system of claim 1, wherein the continuous track includes an outer surface and a plurality of paddles extending outwardly from the outer surface.

10. The watercraft propulsion system of claim 1, further comprising a controller, and a boat speed sensor operably coupled to the controller, wherein the controller causes the tilt control to pivotally adjust the suspension frame in response to input from the boat speed sensor.

11. A watercraft propulsion system comprising:
an outboard motor;
a suspension frame supported by the motor;
a drive wheel operably coupled to the motor;
a first driven wheel supported by the suspension frame in spaced relation to the drive wheel;
a second driven wheel supported by the suspension frame in spaced relation to the drive wheel and the first driven wheel, a track path defined between the drive wheel, the first driven wheel and the second driven wheel;
a continuous track supported by the drive wheel, the first driven wheel and the second driven wheel, the continuous track supported for motion along the track path and including a water engagement surface;
wherein the suspension frame includes a base member and an upright member coupled to the base member, a base actuator coupled to the base member for adjusting the length of the base member, and an upright actuator coupled to the upright member for adjusting the length of the upright member, such that the distance between the first driven wheel and the second driven wheel may be adjusted to vary a length of the water engagement surface; and
a controller operably coupled to the base actuator and the upright actuator for maintaining a constant length of the track path as the length of the base member and the length of the upright member of the suspension frame are adjusted.

12. The watercraft propulsion system of claim 11, further comprising a transom mount for coupling the motor to the transom of a boat, the transom mount including a trim control actuator for vertical adjustment of the suspension frame relative to the transom, and a tilt control actuator for pivoting adjustment of the suspension frame relative to the transom.

13. The watercraft propulsion system of claim 12, further comprising a controller, and a boat speed sensor operably coupled to the controller, wherein the controller causes the tilt control actuator to pivotally adjust the suspension frame in response to input from the boat speed sensor.

14. The watercraft propulsion system of claim 11, wherein the drive wheel includes a plurality of circumferentially spaced cogs, and the continuous track includes an inner surface including a plurality of teeth configured to engage with the cogs of the drive wheel.

15. The watercraft propulsion system of claim 11, wherein the continuous track includes an outer surface and a plurality of paddles extending outwardly from the outer surface.

16. The watercraft propulsion system of claim 11, further comprising a deflector vane position above the second driven wheel for diverting in a rearward direction water thrown by the track when moving in a forward direction.

17. The watercraft propulsion system of claim 16, further comprising a cowling supported over the motor and supporting the deflector vane.

18. The watercraft propulsion system of claim 11, wherein the continuous track includes an upper run engaging the first driven wheel, the second driven wheel and the drive wheel, and a lower run engaging the first driven wheel and the second driven wheel, the lower run extending below the upper run and including a downwardly facing water engagement surface.

19. The watercraft propulsion system of claim 11, further comprising a track speed sensor operably coupled to the controller, wherein the controller causes the base actuator to adjust the water engagement surface in response to input from the track speed sensor.

20. A method of propelling a watercraft comprising the steps of:
providing a boat including a transom;
providing an adjustable suspension frame coupled to the transom of the boat;
rotating a continuous track on the suspension frame, wherein the continuous track includes an upper run engaging a first driven wheel, a second driven wheel and a drive wheel, and a lower run engaging the first driven wheel and the second driven wheel, the lower run extending below the upper run and including a downwardly facing water engagement surface;
detecting the speed of the continuous track; and
varying a length of the downwardly facing water engagement surface of the continuous track contacting the water based upon the detected speed.

21. The method of claim 20, further comprising the step of activating a tilt control actuator to adjust the angular orientation of the track.

22. The method of claim 21, further comprising the step of activating a trim control actuator to adjust the vertical position of the track.

23. The method of claim 20, wherein the drive wheel includes a plurality of circumferentially spaced cogs, and the continuous track includes an inner surface including a plurality of teeth configured to engage with the cogs of the drive wheel.

24. The method of claim 20, wherein the continuous track includes an outer surface and a plurality of paddles extending outwardly from the outer surface.

25. The method of claim 20, further comprising a deflector vane position above the second driven wheel for diverting in a rearward direction water thrown by the track when moving in a forward direction.

26. The method of claim 20, wherein the step of varying the downwardly facing water engagement surface includes adjusting the suspension frame by moving the second driven wheel relative to the first driven wheel, while maintaining a constant tension within the continuous track.

27. The method of claim 26, wherein the suspension frame includes a base member and an upright member coupled to the base member, a base actuator coupled to the base member for adjusting the length of the base member, and an upright actuator coupled to the upright member for adjusting the length of the upright member, such that the distance between the first driven wheel and the second driven wheel may be adjusted to vary the water engagement surface.

* * * * *